United States Patent
Kim et al.

(10) Patent No.: US 8,532,894 B2
(45) Date of Patent: Sep. 10, 2013

(54) SHIFTING RANGE SENSING DEVICE AND SHIFTING OPERATION DEVICE WITH THE SAME

(75) Inventors: Eunsik Kim, Daegu (KR); Kangyoung Kim, Daegu (KR); Dohyon Won, Suwan-si (KR)

(73) Assignees: Hyundai Motor Company, Seoul (KR); Kia Motors Corporation, Seoul (KR); Kyun Chang Industrial Co., Ltd., Daegu (KR)

( * ) Notice: Subject to any disclaimer, the term of this patent is extended or adjusted under 35 U.S.C. 154(b) by 151 days.

(21) Appl. No.: 13/180,258

(22) Filed: Jul. 11, 2011

(65) Prior Publication Data

US 2012/0137810 A1 Jun. 7, 2012

(30) Foreign Application Priority Data

Dec. 1, 2010 (KR) .................. 10-2010-0121669

(51) Int. Cl.
*B60K 20/02* (2006.01)
*F16H 59/08* (2006.01)
*F16H 59/02* (2006.01)
*F16H 59/10* (2006.01)

(52) U.S. Cl.
CPC .......... *F16H 59/0204* (2013.01); *F16H 59/105* (2013.01); *B60K 20/02* (2013.01)
USPC .............. 701/64; 701/62; 180/336; 180/332; 74/473.3; 324/207.2; 324/207.25

(58) Field of Classification Search
USPC ........................................ 180/336; 74/473.3
See application file for complete search history.

(56) References Cited

U.S. PATENT DOCUMENTS

| | | | | |
|---|---|---|---|---|
| 6,012,352 A * | 1/2000 | Ishii et al. | .................. | 74/473.18 |
| 6,089,118 A * | 7/2000 | Ishii et al. | .................. | 74/473.18 |
| 7,086,306 B2 * | 8/2006 | Syamoto et al. | ........... | 74/473.33 |
| 2004/0237692 A1* | 12/2004 | Syamoto et al. | ........... | 74/473.12 |
| 2012/0137810 A1* | 6/2012 | Kim et al. | ..................... | 74/473.1 |
| 2012/0318090 A1* | 12/2012 | Bak et al. | ................... | 74/473.12 |

FOREIGN PATENT DOCUMENTS

| | | | |
|---|---|---|---|
| JP | 11-042954 A | | 2/1999 |
| JP | 11042954 A | * | 2/1999 |
| JP | 2003-154868 A | | 5/2003 |
| JP | 2003154868 A | * | 5/2003 |
| KR | 20070060735 A | | 6/2007 |
| KR | 20090049901 A | | 5/2009 |
| KR | 20090111111 A | | 10/2009 |
| KR | 20100070593 A | | 6/2010 |

\* cited by examiner

*Primary Examiner* — Shelley Chen
(74) *Attorney, Agent, or Firm* — Morgan, Lewis & Bockius LLP

(57) ABSTRACT

A shifting range sensing device may include an electronic communication unit that includes a housing fixed to an outside of an external bracket of a shift lever, a magnet being disposed in the housing and rotatable in a forward-backward direction therein wherein the magnet pivots with rotation of the shift lever in the forward-backward direction, and a Hall sensor sensing the forward-backward direction movement of the magnet, and a microswitch electrically connected with the electronic communication unit and engaged to a side of the shift lever, wherein the microswitch may be turned on/off in accordance with a left-right rotation of the shift lever, wherein the microswitch transmits on/off signal to the electronic communication unit and the electronic communication unit transmits information sensed by the Hall sensor and the on/off signal sensed by the microswitch to a transmission controller.

10 Claims, 7 Drawing Sheets

FIG.3
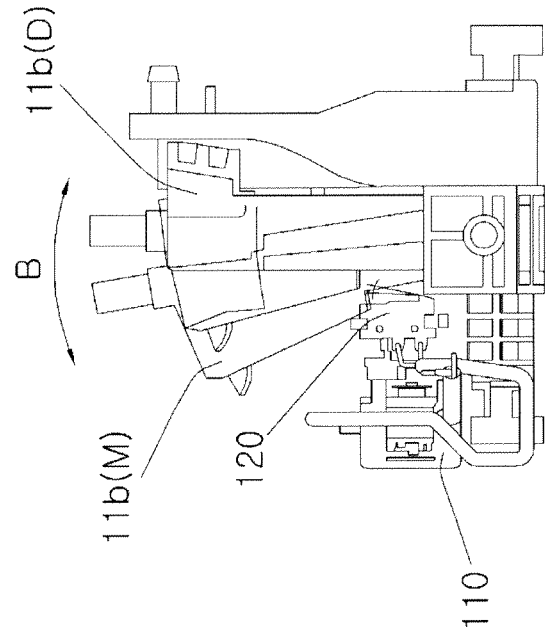
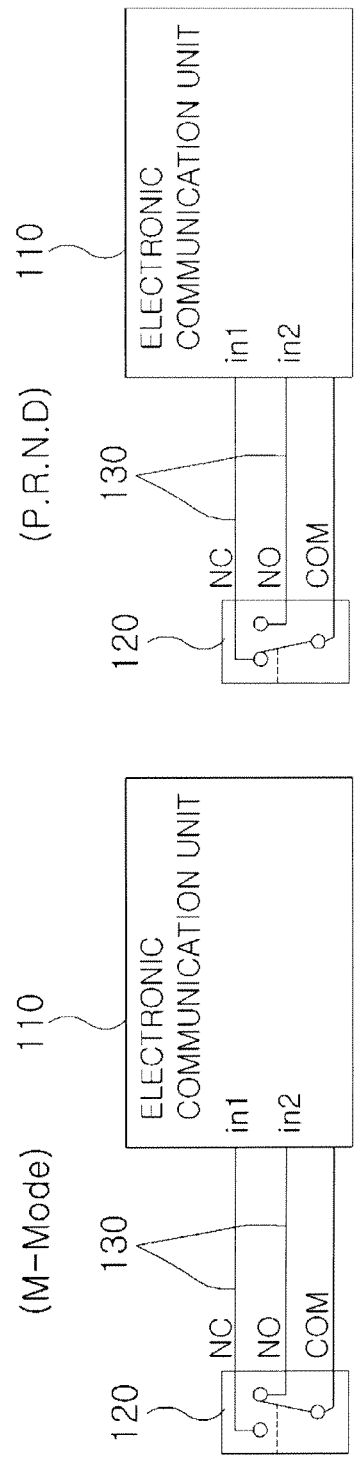

SHIFTING RANGE SENSING DEVICE AND SHIFTING OPERATION DEVICE WITH THE SAME

CROSS-REFERENCE TO RELATED APPLICATIONS

The present application claims priority to Korean Patent Application Number 10-2010-0121669 filed Dec. 1, 2010, the entire contents of which application is incorporated herein for all purposes by this reference.

BACKGROUND OF THE INVENTION

1. Field of the Invention

The present invention relates to a shifting range sensing device, and more particularly, to a technology associated with a device for detecting the current shifting range from the operation of a shifting lever.

2. Description of Related Art

In automatic transmission vehicles of the related art, operational force for a shift lever that is operated by a driver is transmitted to an inhibitor switch in the automatic transmission and a manual valve of a valve body through a cable.

Accordingly, even if the inhibitor switch transmits incorrect information due to a failure, the manual valve mechanically receives the operational force of the shift lever and operates, such that shifting in the vehicle could be stably controlled.

In the DCT (Double Clutch Transmission), however, since a controller operates a motor in response to a signal from an inhibitor switch to perform shifting, such that when incorrect information is transmitted to the controller due to a failure of the inhibitor switch, shifting control stability of the vehicles could not be ensured.

That is, when a driver moves the shift lever to the N-range and the inhibitor switch transmits an R-range signal due to a failure, the controller correspondingly controls the DCT, and as a result, the driver is exposed to a danger of accident by unexpected reverse of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide a shifting range sensing device that can ensure stability in control of shifting of a vehicle, by making it possible to accurately providing information on the shifting range selected by a driver from the operational state of a shifting lever as a supplementary measure, even if an inhibitor switch mounted in a transmission sends out wrong information due to malfunction, and a transmission apparatus equipped with the device for a vehicle.

In an aspect of the present invention, the shifting range sensing device may include an electronic communication unit that may have a housing fixed to an outside of an external bracket of a shift lever, a magnet being disposed in the housing and rotatable in a forward-backward direction therein wherein the magnet pivots with rotation of the shift lever in the forward-backward direction, and a Hall sensor sensing the forward-backward direction movement of the magnet, and a microswitch electrically connected with the electronic communication unit and engaged to a side of the shift lever, wherein the microswitch may be turned on/off in accordance with a left-right rotation of the shift lever, wherein the microswitch transmits on/off signal to the electronic communication unit and the electronic communication unit transmits information sensed by the Hall sensor and the on/off signal received from the microswitch to a transmission controller.

The electronic communication unit may determine movement of the magnet corresponding to the forward-backward rotation of the shift lever which may be sensed by the Hall sensor, as movement in P-, R-, N-, and D-ranges or movement to + and − ranges in an M-range, in accordance with whether the microswitch may be turned on/off.

When the microswitch may be turned off with a switch foot open, the electronic communication unit may determine the movement of the magnet corresponding to the forward-backward rotation of the shift lever which may be sensed by the Hall sensor of the electronic communication unit as movement in the P-, R-, N-, and D-ranges, and when the microswitch may be turned on with the switch foot closed, the electronic communication unit may determine that the movement of the magnet corresponding to the forward-backward rotation of the shift lever as movement to the + and − ranges in the M-range.

The microswitch may be a three-step switch having a first electrode, a second electrode, and a third electrode, and when the microswitch may be turned off, the first electrode and the third electrode may be electrically connected and the second electrode may be open, while when the microswitch may be turned on, the second electrode and the third electrode may be electrically connected, the first electrode may be open, and the connection of the first electrode and the second electrode may be transmitted to the electronic communication unit.

When it may be determined that both the first electrode and the second electrode may be connected with the third electrode in the microswitch or all the electrodes may be open by the signal transmitted from the electronic communication unit, the transmission controller may determine that defect may have occurred in the microswitch.

The electronic communication unit further may include a power transmission assembly that transmits a rotational displacement of the shift lever as a rotational displacement of the magnet such that the magnet rotates with the forward-backward rotation of the shift lever.

The power transmission assembly may have a connecting rod integrally connected with the magnet and protruding outward from the housing, and a connection groove through which the connecting rod may be inserted in the shift lever, wherein the connection groove may be formed to the shift lever.

According to the exemplary embodiments of the present invention, it is possible to ensure safety in vehicle control, by providing accurate information on a shift range selected by a driver supplementarily from the operation of a shift lever, even if an inhibitor switch mounted in a transmission transmits incorrect information due to a failure.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a structural view showing the operation of a microswitch of the shifting range sensing device according to the exemplary embodiment of the present invention, corresponding to left-right rotation of the shift lever.

Figure 1:
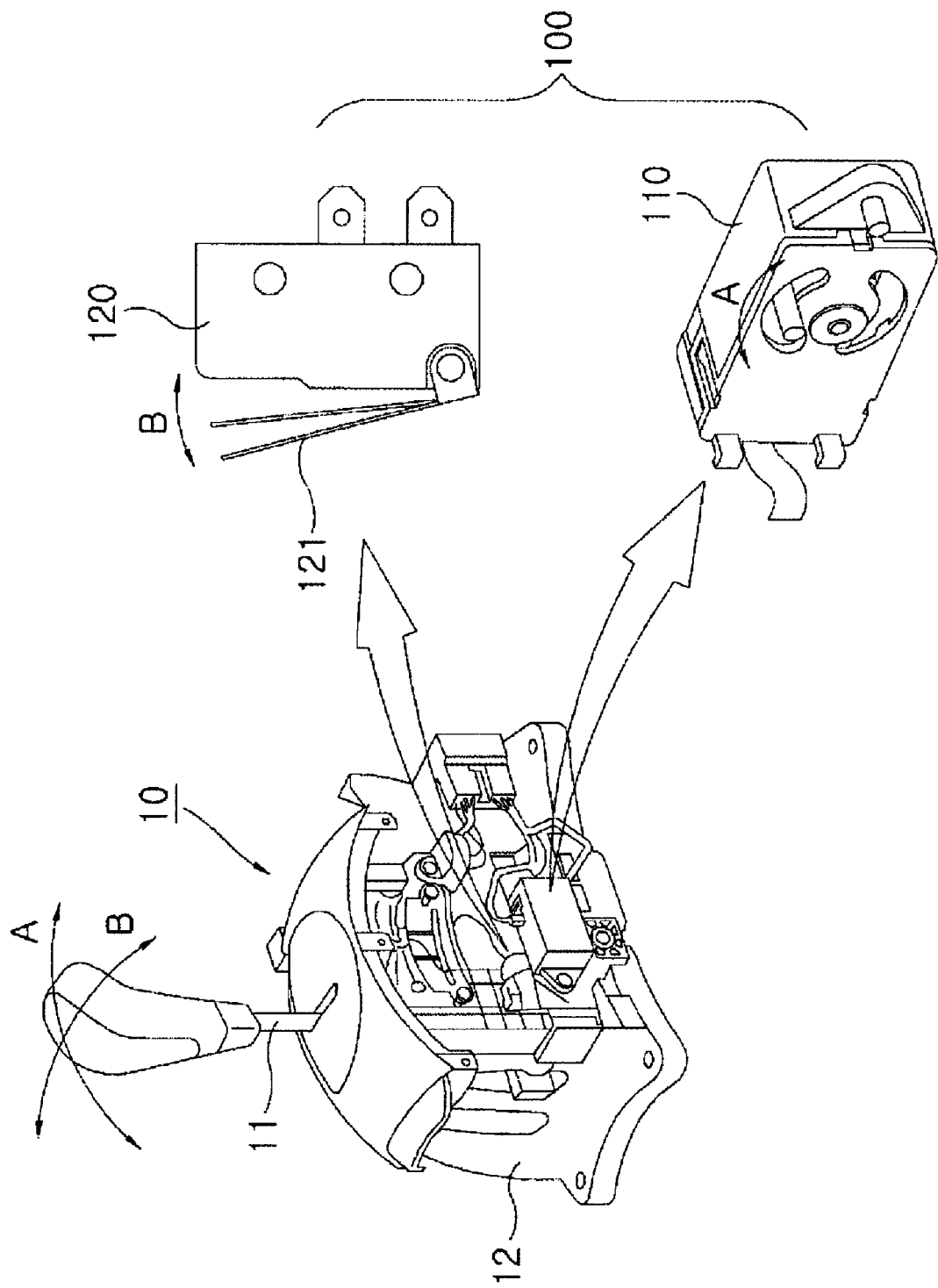
FIG. 1 is a perspective view showing when a shifting range sensing device according to an exemplary embodiment of the present invention has been mounted.
Figure 2:
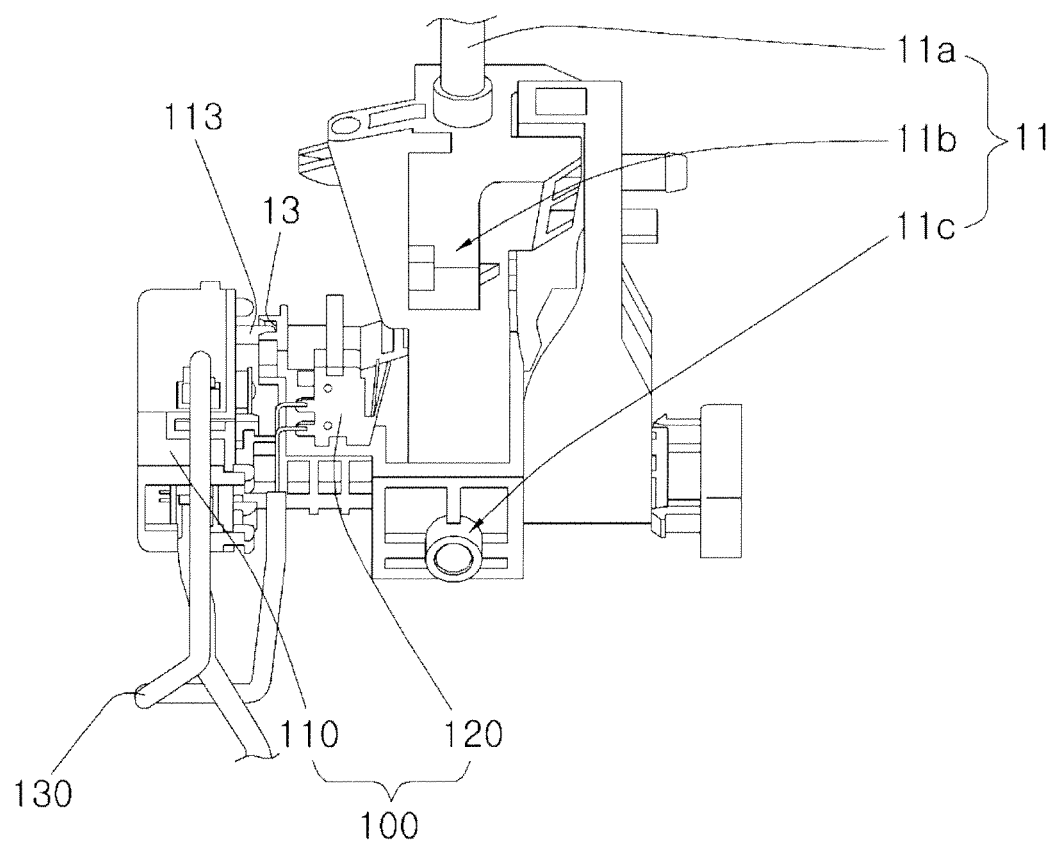
FIG. 2 is a perspective view illustrating the connection structure of a shift lever and a shifting range sensing device according to the exemplary embodiment of the present invention.
Figure 4:
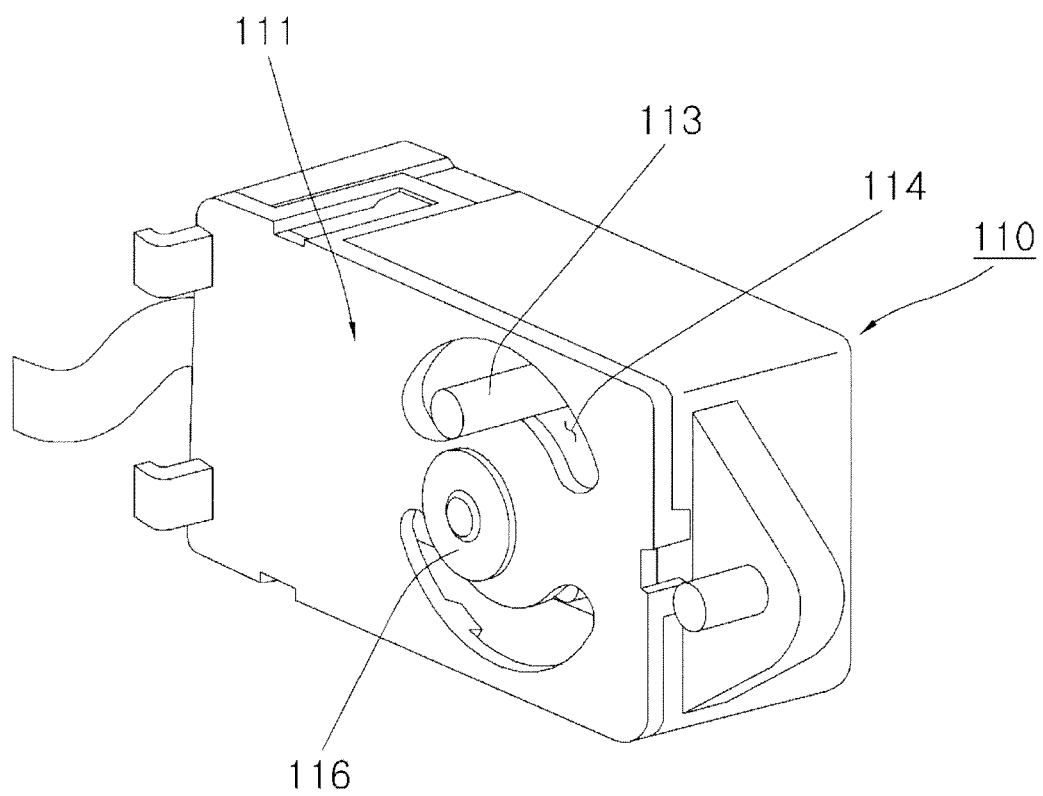
FIG. 4 is a view showing the external appearance of an electronic communication unit of the shifting range sensing device according to the exemplary embodiment of the present invention.
Figure 5:
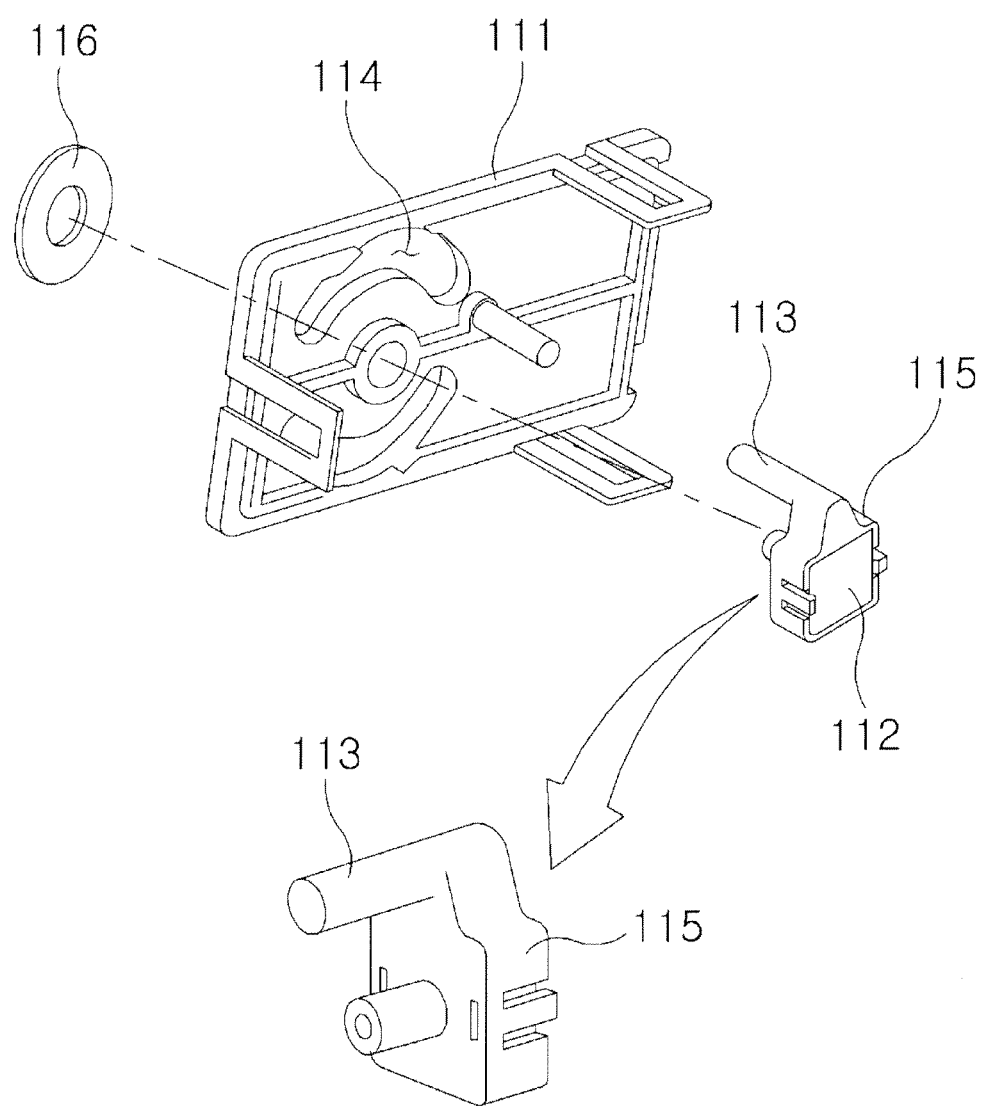
FIG. 5 is a perspective view showing the combination structure of a magnet housing and a housing of the electronic communication unit shown in FIG. 4.
Figure 6:
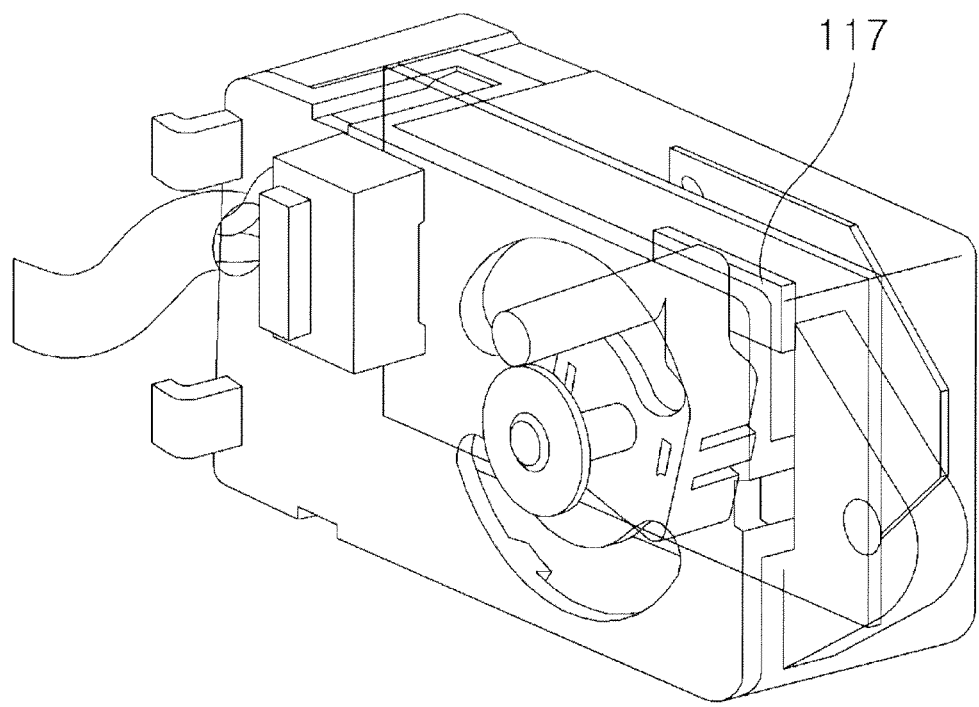
FIG. 6 is a structural view showing the inside of the electronic communication unit shown in FIG. 3.
Figure 7:
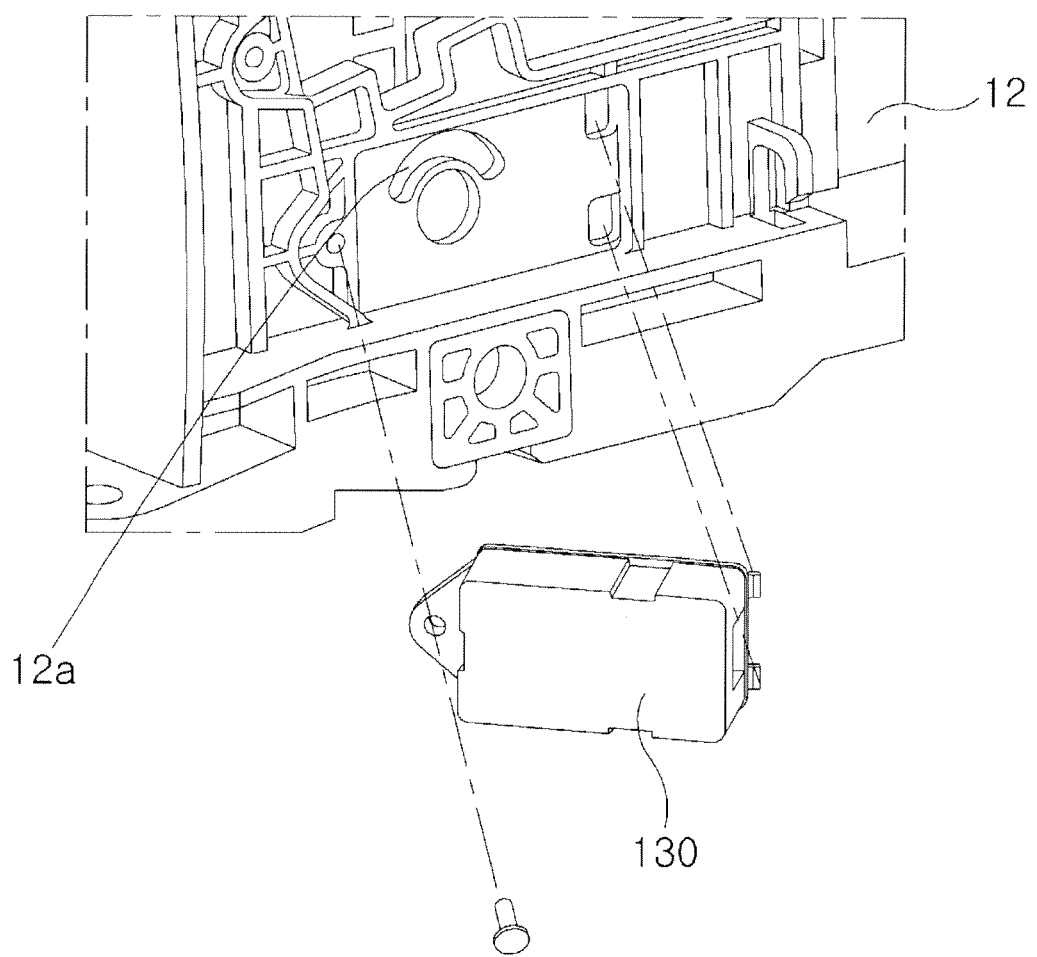
FIG. 7 is a structural view when the shifting range sensing device according to the exemplary embodiment of the present invention is mounted on an external bracket.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention are described hereafter with reference to the accompanying drawings, for those skilled in the art to easily implement the present invention.

Referring to FIGS. 1 to 7, a shifting range sensing device 100 according to an exemplary embodiment of the present invention and a shifting operating device 10 of a vehicle are shown.

First, shifting range sensing device 100 includes an electronic communication unit 110 and a microswitch 120.

Electronic communication unit 110 includes a housing 111 disposed outside an external bracket 12 of a shift lever 11, a magnet 112 disposed to be rotatable forward/backward A in housing 111 and rotating with forward/backward A rotation of shift lever 11, and a Hall sensor 117 disposed in housing 111 and sensing movement of magnet 112. Further, shifting range sensing device 100 further includes power transmissions 113 and 13 that transmits rotation of shift lever 11 into rotation of magnet 112 such that magnet 112 rotates with the rotation of shift lever 11.

Microswitch 120 is electrically connected with electronic communication unit 110 by a wire ring 130 and fixed to a side of shift lever 11, such that it is turned on/off by rotation of shift lever 11 in the left-right direction B. When shift lever 11 is switched from the D-range to the M-range for traveling in a manual mode, a switch foot 121 is pressed and microswitch 120 is turned on, and when shift lever 11 is switched from the M-ranged to the D-range, switch foot 121 that has been pressed is separated and microswitch 120 is turned off. Microswitch 120 transmits whether to be turned on/off to electronic communication unit 110 through wire ring 130.

Microswitch 120 is a three-step switch composed of a first electrode NC, a second electrode NO, and a third electrode COM. When the microswitch is turned off, first electrode NC and third electrode COM are electrically connected and second electrode NO is open, and when it is turned on, second electrode NO and third electrode COM are electrically connected and first electrode NC is open.

When microswitch 120 is turned off by shift lever 11, first electrode NC and third electrode COM are electrically connected, and a signal is sent to a first input terminal in1 of electronic communication unit 110 electrically connected with first electrode NC, while a signal is not sent to a second input terminal in2.

When microswitch 120 is turned on by shift lever 11, second electrode NC and third electrode COM are electrically connected, and a signal is sent to second input terminal in2 of electronic communication unit 110 electrically connected with first electrode NC, while a signal is not sent to first input terminal in1. Defect or a fault may be in microswitch 120, when the same signal or no signal is sent to first input terminal in1 and second input terminal in2. That is, it is possible to determine whether there is defect or a fault and increase safety by using a third-step switch as microswitch 120.

That is, electronic communication unit 110 generates and transmits a signal that is supplied in accordance with On/Off of microswitch 120 and a signal for movement of shift lever 11 in the left-right direction B and the forward-backward direction A in response to a signal detected by Hall sensor 117, to a transmission controller. Further, the transmission controller can determine the position of the shifting range of shift lever 11, from a signal transmitted from shifting range sensing device 100.

Therefore, when microswitch 120 is turned off, the transmission controller can know which shifting range in the P-, R-, N-, and D-ranges has been selected by shift lever 5, in accordance with a change in signal detected and transmitted by Hall sensor 117 of electronic communication unit 110. Further, when microswitch 120 is turned on, the transmission controller can know whether the + and − ranges have been selected in the M-range by shift lever 11, in accordance with a change in signal detected and transmitted by Hall sensor 117 of electronic communication unit 110.

Further, power transmissions 113 and 13 that transmit the rotation forward-backward direction A which is transmitted from shift lever 11 are integrally connected with magnet 112 and have a connecting rod 113 that protrudes outward from housing 111 and a connecting groove 13 through which connecting rod 113 is inserted in shift lever 11.

Connecting rod 113 is integrally formed with magnet housing 115 covering magnet 112 and magnet housing 115 is disposed rotatably with respect to housing 111 by rotary fixing pin 116 passing through housing 111. Obviously, housing 111 has an arc-shaped slot 114 such that connecting rod 113 can move with the rotation of shift lever 11 in the forward-backward direction A.

Further, two arc-shaped slots 114 are formed symmetrically with respect to rotary fixing pin 116, such that they may be used when electronic communication unit 110 is supposed to be mounted in the opposite direction to the exemplary embodiment shown in FIG. 1.

Further, shift lever 11 includes a lever bar 11a receiving the operational force from a driver, an upper block 11b integrally combined with lever bar 11a, and a lower block 11c disposed to rotate when lever bar 11a is selected in a shifting range, and rotatably supporting upper block 11b.

Therefore, the operational force in the forward-backward direction A of shift lever 11 applied by the driver is transmitted through lever bar 11a and the selecting a shifting range in the forward-backward direction A by lever bar 11a is the same as rotation of lower block 11c in the forward-backward direction A, such that connecting groove 13 is formed at lower block 11c. Further, the operational force in the left-right direction B of shift lever 11 applied by the driver is transmitted to upper block 11b through lever bar 11a, microswitch 120 is turned off by upper block 11b, and microswitch 120 is disposed at lower block 11c supporting upper block 11b.

Further, housing 111 of electronic communication unit 110 is fixed to the outside of external bracket 12 covering shift lever 11 and external bracket 12 has an arc-shaped hole 12a at the position corresponding to arc-shaped slot 114 of housing 111.

Therefore, with the same basic structure of a shifting operating device for a DCT and a shifting operating device of a common automatic transmission, shifting range sensing device 100 of the present invention can be easily mounted or removed, if needed, such that it is possible to reduce the manufacturing cost by sharing the parts. Further, since it is possible to detect the rotation of shift lever 11 in the left-right direction B with microswitch 120 and it is possible to determine all the rotation of shift lever 11 in the forward-backward direction A and the left-right direction B with electronic communication unit 110, it is possible to simplify shifting range sensing device 100 and reduce the manufacturing cost.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shifting range sensing device comprising:
   an electronic communication unit that includes:
      a housing fixed to an outside of an external bracket of a shift lever;
      a magnet being disposed in the housing and rotatable in a forward-backward direction therein wherein the magnet pivotally engaged with the housing via a rotary fixing pin pivots with rotation of the shift lever in the forward-backward direction; and
      a Hall sensor sensing the forward-backward direction movement of the magnet; and
   a microswitch electrically connected with the electronic communication unit and engaged to a side of the shift lever, wherein the microswitch is turned on/off in accordance with a left-right rotation of the shift lever, and
   two arc-shaped slots formed to the housing and symmetrical with respect to the rotary fixing pin;
   wherein the microswitch transmits on/off signal to the electronic communication unit and the electronic communication unit transmits information sensed by the Hall sensor and the on/off signal received from the microswitch to a transmission controller;
   wherein the electronic communication unit further includes a power transmission assembly that transmits a rotational displacement of the shift lever as a rotational displacement of the magnet while the magnet rotates with respect to the rotary fixing pin with the forward-backward rotation of the shift lever; and
   wherein the power transmission assembly has:
      a connecting rod integrally connected with the magnet and protruding outward from the housing through one of the two arc-shaped slots; and
      a connection groove through which the connecting rod is inserted in the shift lever, wherein the connection groove is formed to the shift lever.

2. The shifting range sensing device as defined in claim 1, wherein the electronic communication unit determines movement of the magnet corresponding to the forward-backward rotation of the shift lever which is sensed by the Hall sensor, as movement in P-, R-, N-, and D-ranges or movement to + and − ranges in an M-range, in accordance with whether the microswitch is turned on/off.

3. The shifting range sensing device as defined in claim 2, wherein when the microswitch is turned off with a switch foot open, the electronic communication unit determines the movement of the magnet corresponding to the forward-backward rotation of the shift lever which is sensed by the Hall sensor of the electronic communication unit as movement in the P-, R-, N-, and D-ranges, and when the microswitch is turned on with the switch foot closed, the electronic communication unit determines that the movement of the magnet corresponding to the forward-backward rotation of the shift lever as movement to the + and − ranges in the M-range.

4. The shifting range sensing device as defined in claim 1, wherein the microswitch is a three-step switch having a first electrode, a second electrode, and a third electrode, and when the microswitch is turned off, the first electrode and the third electrode are electrically connected and the second electrode is open, while when the microswitch is turned on, the second electrode and the third electrode are electrically connected, the first electrode is open, and the connection of the first electrode and the second electrode is transmitted to the electronic communication unit.

5. The shifting range sensing device as defined in claim 4, wherein when it is determined that both the first electrode and the second electrode are connected with the third electrode in the microswitch or all the electrodes are open by the signal transmitted from the electronic communication unit, the transmission controller determines that defect has occurred in the microswitch.

6. A shifting operating device of a vehicle including the shifting range sensing device as defined in claim 1.

7. A shifting operating device of a vehicle including the shifting range sensing device as defined in claim 2.

8. A shifting operating device of a vehicle including the shifting range sensing device as defined in claim 3.

9. A shifting operating device of a vehicle including the shifting range sensing device as defined in claim 4.

10. A shifting operating device of a vehicle including the shifting range sensing device as defined in claim 5.

\* \* \* \* \*